G. C. WOODDELL AND H. C. REESER.
POWER AGRICULTURAL IMPLEMENT.
APPLICATION FILED MAR. 22, 1920.

1,389,612.

Patented Sept. 6, 1921.
3 SHEETS—SHEET 1.

INVENTOR.
GEORGE C. WOODDELL
HARRY C. REESER
BY
ATTORNEYS.

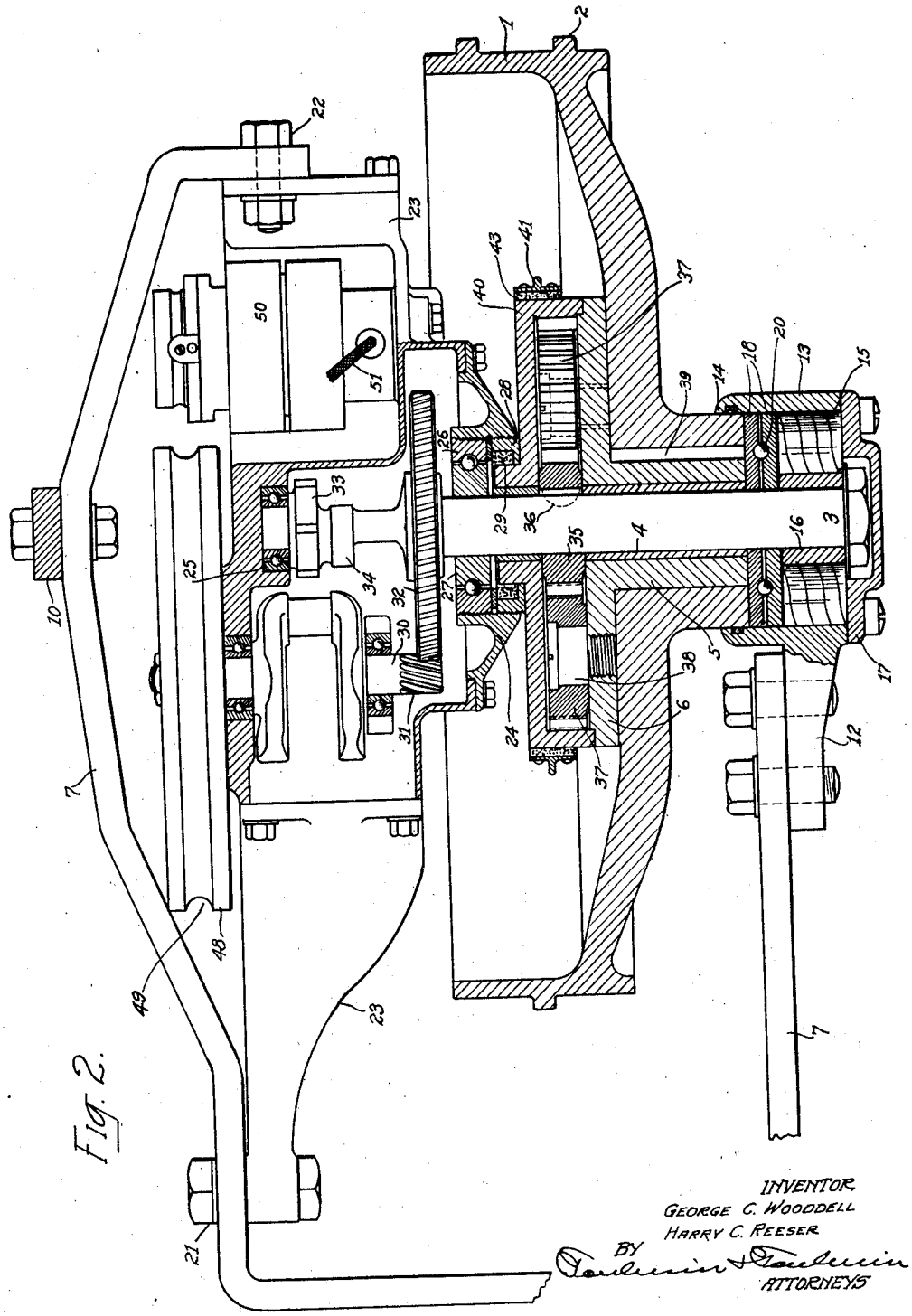

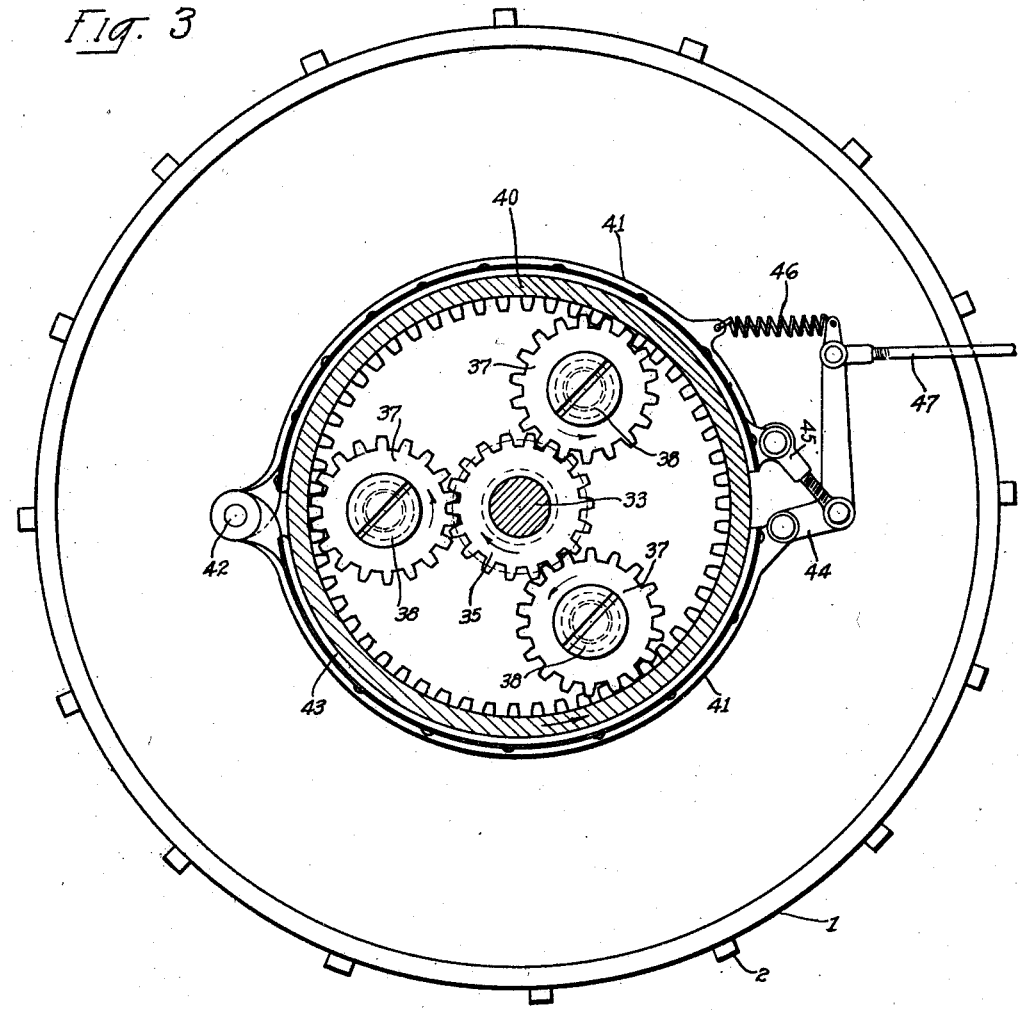

UNITED STATES PATENT OFFICE.

GEORGE C. WOODDELL AND HARRY C. REESER, OF DAYTON, OHIO.

POWER AGRICULTURAL IMPLEMENT.

1,389,612.

Specification of Letters Patent. Patented Sept. 6, 1921.

Application filed March 22, 1920. Serial No. 367,596.

*To all whom it may concern:*

Be it known that we, GEORGE C. WOODDELL and HARRY C. REESER, citizens of the United States, residing at Dayton, in the county of Montgomery and State of Ohio, have invented certain new and useful Improvements in Power Agricultural Implements, of which the following is a specification, reference being had therein to the accompanying drawing.

This invention relates to a power agricultural implement and more particularly to a small hand-controlled and directed power implement or tractor to be used for cultivating and harrowing gardens, such as vegetable and flower patches.

The object we have in view is to produce a simple and cheap little power implement for the purposes just stated, and one which may be easily controlled and directed by the operator walking behind it. The arrangement and features of construction by which this object is carried into effect will hereinafter fully appear.

In the accompanying drawings:

Fig. 2 is a partial plan and horizontal sectional view taken through the axis of the machine; and Fig. 3 is a side elevation of the master wheel and a partial sectional and side view of the planetary gearing which forms a feature of our machine.

Figure 1:
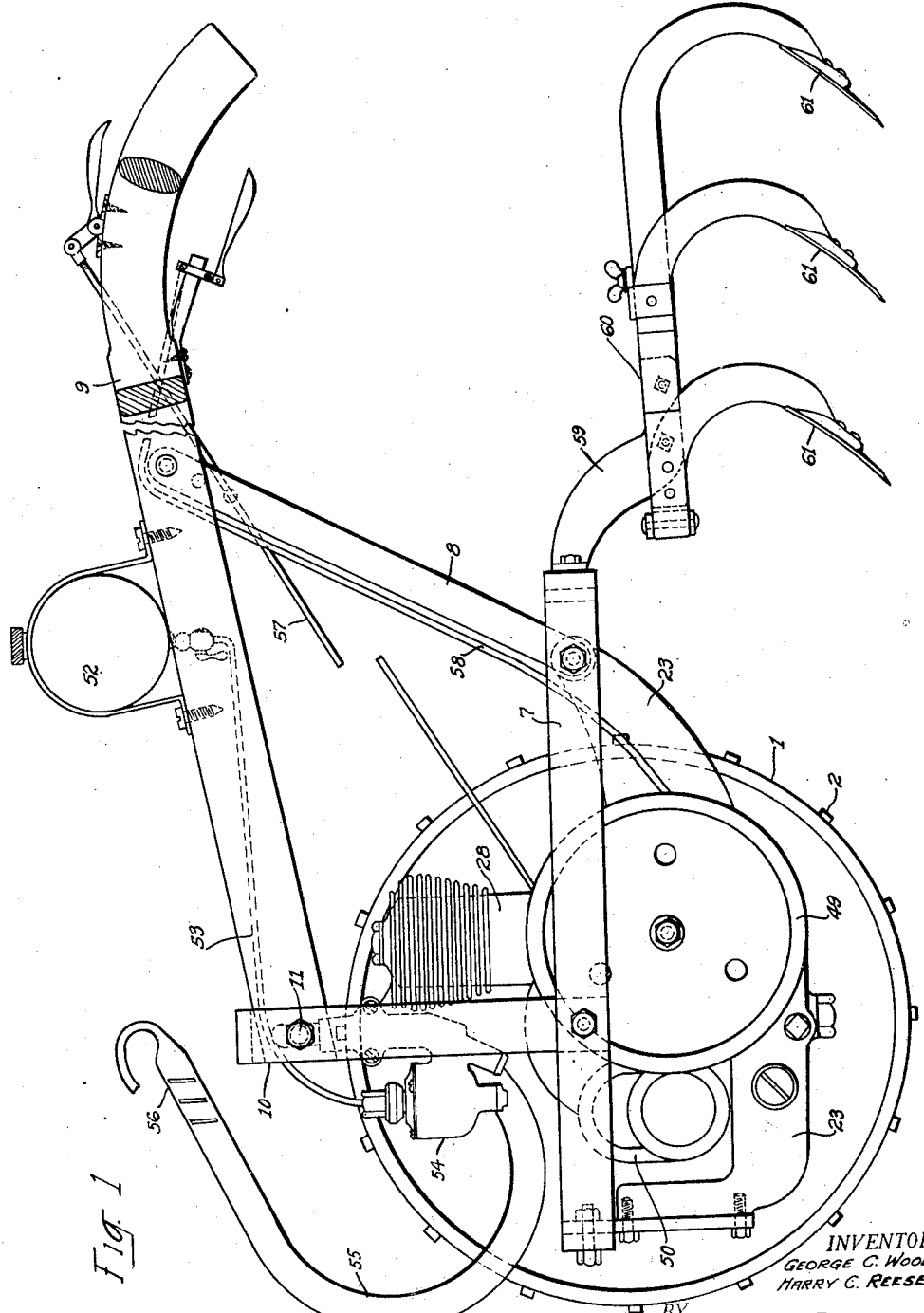
Figure 1 is a side elevation of our improved power implement.

1 designates a master wheel to which the tractive power is transmitted. Preferably the periphery of the wheel has cleats or projections 2 to take into the soil and increase the traction. This wheel carries a shaft 3 which is mounted within the wheel through an intermediate bushing 4 and a sleeve 5 forming a part of a disk 6 which itself is a portion of the casing of the planetary gearing.

A general frame in the form of a stout bar 7 is supported by the master wheel through the shaft 3 in a manner to be presently pointed out. This frame carries braces 8 for the support of the rear portions of the handle, a standard in the form of an arch 10 being secured to the member 7 and extended upwardly for securing the forward ends of the handles, as shown at 11 in Fig. 1. The connection of the frame 7 at one side with the shaft 3 is by means of a casting 12, one portion of which is bolted to the member 7 and the other portion 13 of which encircles the hub of the master wheel, as shown at 14, and rollers 15 which constitute a roller bearing. A bushing 16 on the shaft 3 supports the rollers 15 and a cap 17 covers one end of the rollers, while washers 18 are placed between the other end of the rollers and the hub of the master wheel, with an intervening ball bearing 20 constituted of balls traveling in races in the opposite faces of the washers 18.

The frame member 7 at the other side of the machine is secured at the points 21 and 22 to the combined engine base and crank case 23. The case, in turn, is mounted on the shaft 3 by the bearings 24 and 25. These are conventional ball bearings and need not be described in detail, as the construction is fully shown in Fig. 2. It may be added, however, with respect to the bearing 24, that the casing carries the outer member 26 of the ball race while the inner member 27 is secured upon the shaft 3. Also that the casing carries the ring 28 with its absorbent washer 29, to prevent the lubricant from leaking out.

By means of these two bearings 24 and 25 the engine bed or crank casing 23 is duly supported upon the shaft 3 and in turn supports the frame member 7.

The engine 28 is supported upon this casing 23 in any convenient manner, as is also the engine shaft 30 which has a worm screw 31, that meshes with a worm gear 32 fixed on the engine shaft 3, by which arrangement the motion developed by the engine is transferred to the master wheel through the mechanism now to be described.

We will first state, however, that this shaft also carries a cam 33 for operating the exhaust valve of the engine and a cam 34 for actuating the oil pump, but these features are conventional ones and form no part of this invention.

A driving pinion 35 is secured on the shaft 3 by a key 36 and meshes with several pinions 37 mounted on stud shafts 38 secured in the disk 6, to the sleeve 5 of which the master wheel is keyed at 39, to which reference has heretofore been made.

These pinions 37 mesh with an internal gear 40 loosely mounted on the shaft 3, with the bushing 4 intervening. These several gears constitute as a whole a planetary gear.

As so far described, motion from the engine will idly operate these several gears on their own axes without rotating the shaft 3 and thence the master wheel. To apply the power to this wheel the internal gear wheel 40 must, of course, be locked against rotation so as to prevent the pinions 37 from rotating and to constitute of them a positive connection between the internal gear 40 and the pinion 35, whereby the rotation of the latter will produce the planetary movement of the pinions 37 and the gear 40 around the axis of the pinion 35, the result being the rotation about that axis of the disk 6 and its sleeve 5, which being keyed to the master wheel drives it and thereby causes the machine to travel over the ground.

One instrumentality for locking the internal gear against rotation is shown in the form of a clamping band 41, preferably made in halves pivoted together at 42, with an intervening gripping material 43, such as commonly used in automobile brakes. The ends of the sections of the hand 41 are connected directly with one end of a bell crank lever 44 and a link 45, one end of which is also connected to the bell crank lever. A spring 46 serves to operate the lever in one direction to release the grip, while a hand rod 47 is used to operate the lever to draw the band sections tightly against the outer surface of this internal gear wheel 44, for the purpose of locking it against rotation, as before stated. The rod 47 will extend to any convenient point to be actuated by the operator.

Referring again to the engine devices the fly wheel is indicated at 48 which may be grooved, as shown at 49, for receiving a suitable belt for use about a farm in operating churns, small pumps, etc. A usual magneto is indicated at 50, while at 51 is shown a contact post and ignition wire.

A gasolene tank 52 is preferably mounted on the handles 9 and connected by a tube 53 with a carbureter 54. An exhaust pipe is shown at 55. It terminates in a muffling construction indicated at 56.

To control the speed of the engine a conventional form of throttle is shown at 57 consisting of a rod which controls the gasolene supply to the carbureter.

To open and close the exhaust valve, the opening of which will stop the engine, we use a rod 58 operable from near the handle 9.

We have shown connected with our power machine one form of implement which in this case is rigidly connected with the frame 7. This implement is a cultivator comprising a coupling bar 59 and usual beams 60 and shovels 61. But it will be understood that other implements, such as harrows, small plows, etc., may be connected with the machine and operated thereby in preparing and cultivating gardens and trucking patches.

Our machine is a simple and compact one and is very efficient and useful in this field of labor. It is easily started and stopped and may be turned around within its own length, as by lifting the handles and the implement and swinging the front end on the master wheel.

It is also useful as a portable motor, in which case the fly wheel may be used in driving a belt to operate churns, washing machines, small grinders, etc.

Having thus fully described our invention, what we claim as new and desire to secure by Letters Patent, is:—

1. In a garden tractor, the combination, with a master wheel, its shaft and planetary gearing mounted on the shaft and connected with the wheel, of a general frame and an engine bed supported on said shaft, an explosive engine carried by the bed and having its shaft geared to the shaft of the master wheel.

2. In a garden tractor, the combination, with a master wheel, its shaft and planetary gearing mounted on said shaft comprising a disk connected with the master wheel, pinions mounted on the disk, an internal gear wheel meshing with said pinions, clamping or locking devices to secure said internal gear against rotation or to release it, and a pinion on said shaft meshing with the other pinions, of a frame and an engine bed supported on said master shaft, an engine on the bed having a worm on its shaft, and a worm gear on said master shaft.

3. In a garden tractor, a master wheel, a shaft therefor, a planetary gearing mounted on said shaft and one member thereof connected with said wheel, and clamping or locking devices to hold or release one member of the planetary gearing, of a frame supported at one side on the master shaft, an engine bed at the other side also supported on said shaft and another portion of the frame supported on said bed, an engine on the bed having a worm on its shaft, and a worm gear on the master shaft meshing with said worm.

In testimony whereof, we affix our signatures.

GEORGE C. WOODDELL.
HARRY C. REESER.